V. P. HOLLIS.
MOWER.
APPLICATION FILED OCT. 19, 1908.
960,551.
Patented June 7, 1910.
3 SHEETS—SHEET 3.
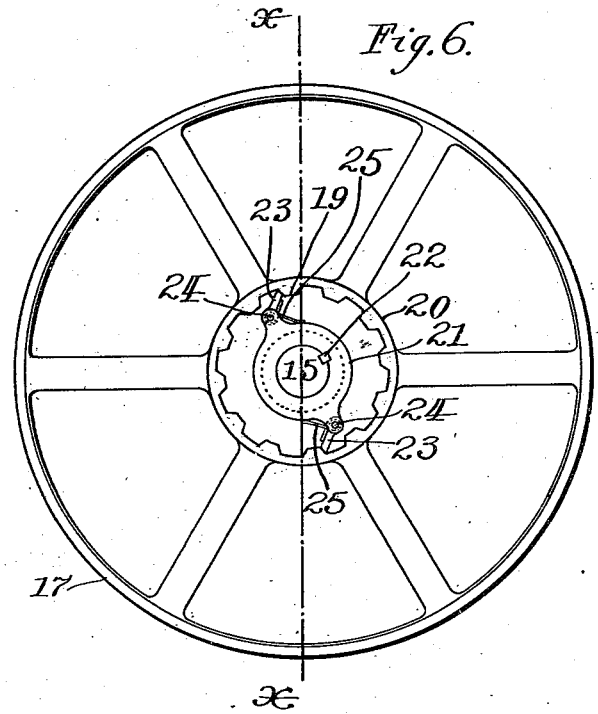
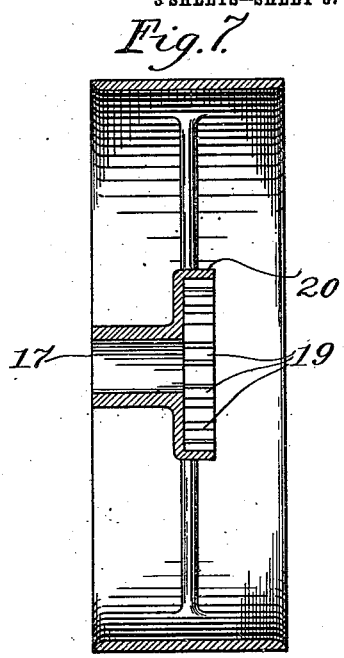
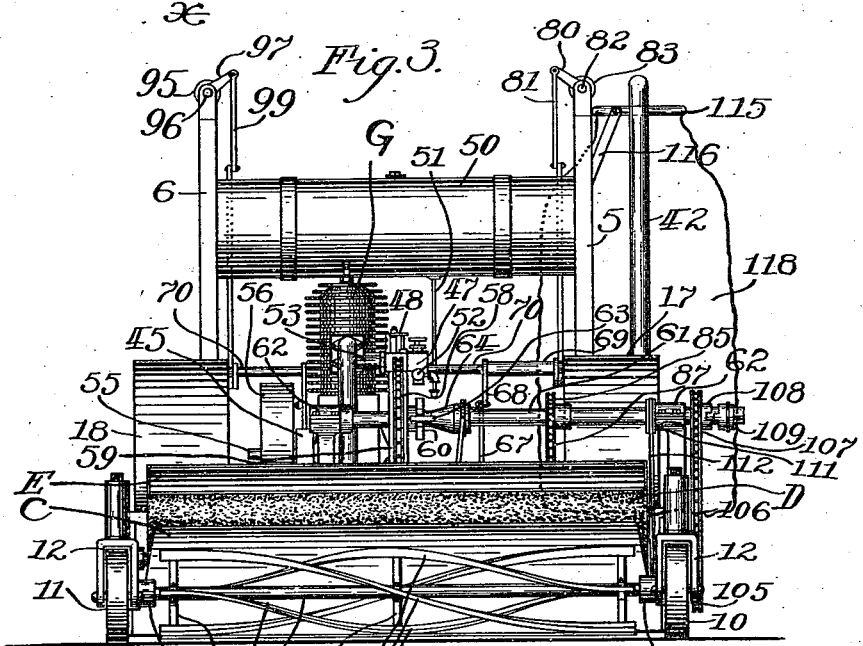
Witnesses:
H. L. Fischer
R. A. Fischer
Inventor:
Venning P. Hollis,
by J. G. Bradbury
Attorney.

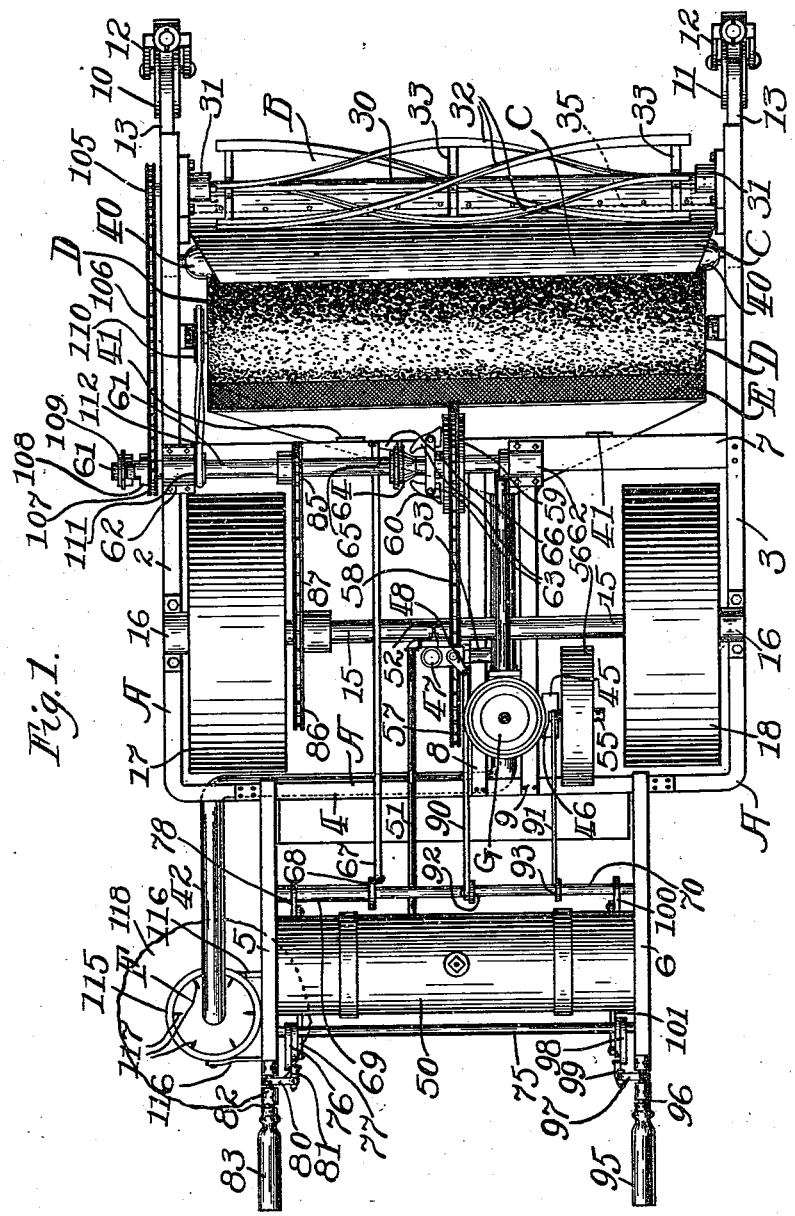

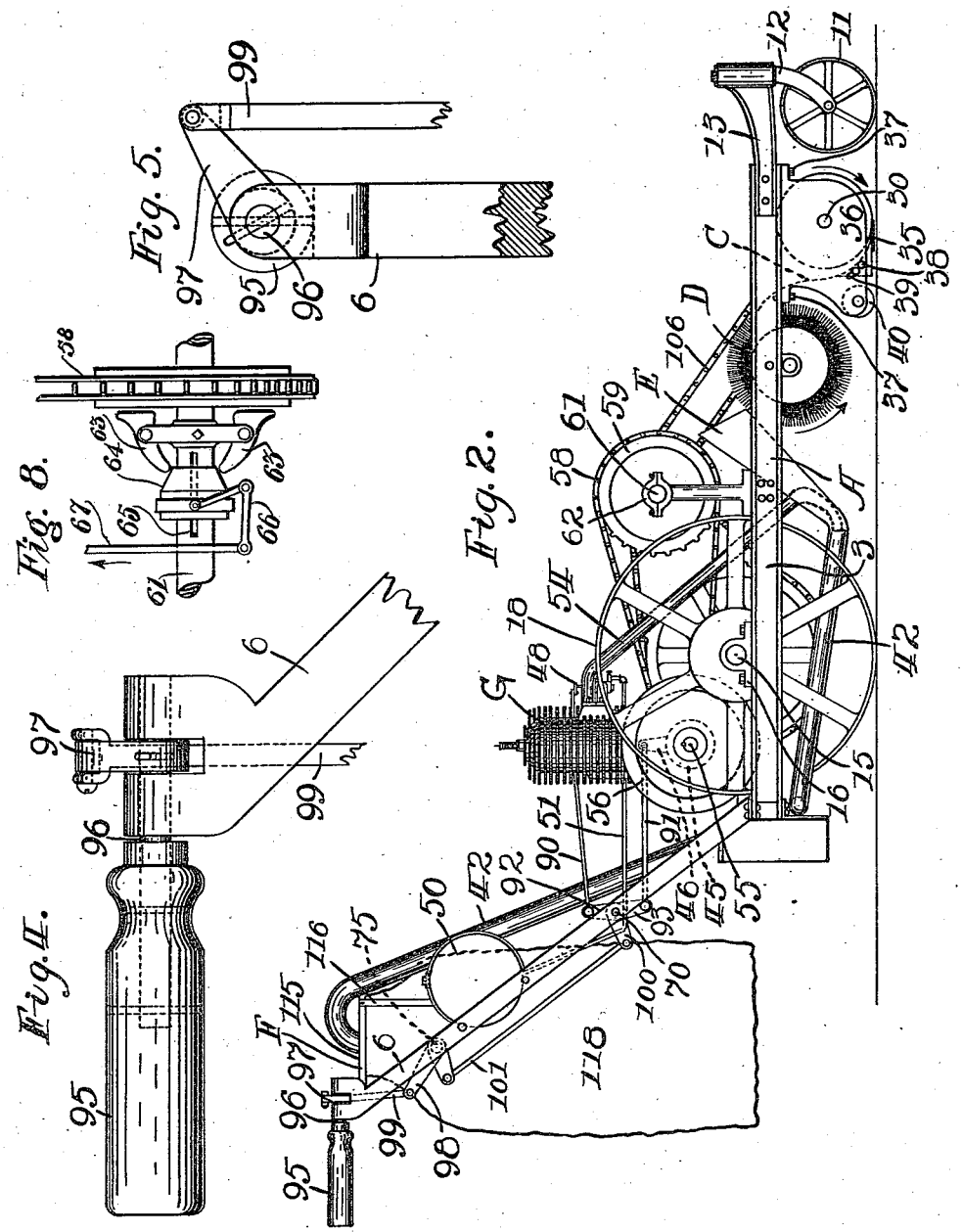

UNITED STATES PATENT OFFICE.

VENNING P. HOLLIS, OF MINNEAPOLIS, MINNESOTA.

MOWER.

960,551.  Specification of Letters Patent.  Patented June 7, 1910.

Application filed October 19, 1908. Serial No. 458,335.

*To all whom it may concern:*

Be it known that I, VENNING P. HOLLIS, a citizen of the United States, residing at Minneapolis, in the county of Hennepin and State of Minnesota, have invented a new and useful Improvement in Mowers, of which the following is a specification.

My invention relates to improvements in mowers and more particularly to that class which is adapted for use on lawns for cutting and removing grass.

The primary object of this invention is a machine of its class which is adapted to run mechanically by simple and inexpensive mechanism and which can be operated entirely by the use of a pair of handles to guide the machine, control the driving mechanism, propel the apparatus and vary the speed of the moving parts.

This invention can be used to advantage in cutting grass within angular spaces and upon uneven ground and is light in weight as compared with prior art devices.

In the accompanying drawings forming part of this specification Figure 1 is a plan view of my invention; Fig. 2 is a side view; Fig. 3 is an end view; Fig. 4 is a side view of a detail portion of one of the handles; Fig. 5 is an end view of the construction illustrated in Fig. 4; Fig. 6 is a side view of one of the traction wheels for propelling the device; Fig. 7 is a section of one of the traction wheels taken on the line X—X of Fig. 6, and Fig. 8 is a bottom plan view of the clutch and its connections.

In the drawings A represents a frame having two sides 2 and 3 and a transverse back 4 to which is riveted or otherwise secured a pair of upwardly and rearwardly inclined handle-bars 5 and 6. Between the sides 2 and 3 is a transverse beam 7 and between said beam and the back of the frame are longitudinal strips 8 and 9 which serve to reinforce the strength of the frame and support the working parts of the machine thereon. The front end of the frame is carried upon a pair of idle wheels 10 and 11 one being located at the forward end of each side of the frame and freely journaled by casters 12 which are mounted by means of forwardly projecting brackets 13 upon said sides. The back portion of the frame is provided with a transverse shaft 15 which is journaled in supports 16 upon the sides and carries traction wheels 17 and 18 thereon. Each of the wheels 17 and 18 has an inner toothed surface 19 in its hub 20 and within said hub is a sleeve 21, keyed to the shaft 15 at 22 and carrying oppositely disposed dogs 23 which are pivoted at 24 thereon and pressed outwardly into engagement with the teeth in the hub by means of springs 25. These dogs 23 engage the teeth 19 and drive the wheels 17 and 18 forward from the drive shaft 15 and when turning a corner one of the wheels 17 or 18 turns faster than said shaft said dogs sweeping over the teeth to allow this movement. Any clutch mechanism of ordinary construction may be employed to accomplish this result, it being common practice to apply differential mechanism to power driven vehicles of this nature and this feature of construction not forming part of my invention.

Transversely arranged between the sides 2 and 3 and journaled freely thereupon by means of a shaft 30 running in journal blocks 31 is a grass cutting knife reel B, the blades 32 of which being mounted upon spider frames 33 which are carried upon the shaft 30 in the usual manner. The blades 32 coöperate with the rigid cutter bar 35 which is mounted upon a pair of depending supports 36 secured by means of bolts 37 to the sides of the frame. Back of the cutter bar is an apron C and a revolving brush D, said apron serving to catch the grass as it is cut by the knife reel and guide it upwardly onto said brush and the brush serving to carry the grass into a hopper E at the back thereof. The cutter bar is secured to supports 36 by means of the bolts 38 passing through slots 39 therein and the apron is carried by the cutter bar and can be changed in position when the cutter bar is adjusted to the knife reel by moving the bolts 38 in said grooves in the usual manner. A guide roller 40 is freely journaled in the supports 36 back of the apron. The hopper E has its mouth immediately adjoining the perimeter of the brush to receive the cut grass and is supported upon the transverse beam 7 on the frame by means of brackets 41. The reduced or inner end of the hopper has attached thereto a conveyer tube or pipe 42 which leads up and into a receptacle F at the side of the handle bars for catching and holding the grass which is cut by the machine.

Mounted upon the longitudinal bars 8 and 9 of the frame is a gasolene engine or motor G by means of which the machine is adapted to be propelled and the working parts operated. This engine may be of any form desired and as shown is of two cycle type being provided with the customary spark mechanism 45 which is operated to vary the advance of the spark by means of the lever 46 and with the carbureter 47 which is adapted to be changed simultaneously with the advance of the spark by means of the lever 48 to control the speed of the engine. Gasolene is admitted from the supply tank 50 to the carbureter by means of the supply pipe 51 which can be opened or closed by the valve 52. Mixture from the carbureter is admitted into the engine by means of the pipe 53. The exhaust from the engine is conducted by means of the pipe 54 to the conveyer tube 42 so as to produce an upward draft through said tube 42 from the hopper E into the grass receptacle.

The engine G has its shaft 55 provided with the usual fly wheel 56 on one end and a drive sprocket 57 on its opposite end over which the main drive chain 58 runs. This drive chain also passes around and transmits motion from the engine to the drive sprocket 59 which is connected by a clutch 60 to a counter-shaft 61. The counter-shaft is journaled in blocks 62 on the beam 7 and has connected thereto the clutch levers 63 which are thrown into coöperation with the clutch to revolve the counter-shaft 61 by means of the cone 64. This cone is feathered at 65 to the counter-shaft and coöperates with a shift lever 66 which is tilted to throw the cone forward or backward by means of a rod 67 said rod being connected to a crank 68 upon a sleeve 69 and said sleeve being adapted to turn freely upon the shaft 70 which is journaled between the handle supports 5 and 6. Another shaft 75 is journaled between the handle supports 5 and 6 and carries a bell crank lever 76. To one arm of said lever 76 is pivotally attached a connecting rod 77 which turns the sleeve 69 by a rock arm 78 to which said rod 77 is pivoted. To the other arm of said lever 76 is operatively connected the handle 83 which is journaled in the handle support 5 by means of the shaft 82 said shaft being joined to the said arm of said lever 76 by a crank arm 80 and a connecting piece 81. By turning said handle the sleeve 69 is turned upon the shaft 70 and cone 64 moved upon the shaft 61 so as to throw the clutch levers into or out of engagement with their coöperating member. The counter-shaft 61 and wheel shaft 15 are operatively connected to revolve the traction wheels by means of sprockets 85 and 86 and the chain 87 which travels around them. The cranks 46 and 48 which vary the position of the spark advance mechanism and the carbureter are connected by rods 90 and 91 to crank arms 92 and 93 upon the shaft 70 so as to move simultaneously and increase or decrease the speed of operation of the engine. The shaft 70 is adapted to be turned to cause this operation by means of the handle 95 which is connected to turn said shaft by means of journaling the handle by a shaft 96 in the handle support 6 and mounting a crank arm 97 upon said handle shaft. A crank lever 100 is mounted upon the shaft 70 and a bell crank lever 98 upon the shaft 75. One arm of the bell crank lever is connected to the crank lever 100 by means of the rod 101 and the other arm is connected to the crank arm 97 by a connecting piece 99.

The handles 83 and 95 permit the machine to be guided by hand and when turned upon their shafts vary the speed of the engine and throw the drive mechanism into and out of operation to propel or stop the machine. The cutting knife reel is adapted to be revolved by means of a sprocket wheel 105 mounted upon the shaft 30, chain 106 and sprocket 107 which is provided with a clutch member 108 turning freely upon the counter-shaft 61. A clutch member 109 is slidingly secured upon the counter-shaft 61 and when thrown into coöperation with the member 108 is adapted to transmit motion from the counter-shaft 61 to the cutting reel. The brush D is revolved continuously from the counter-shaft 61 by means of pulleys 110, 111 and a cross belt 112.

In operation the brush and cutting knife reel are revolved in the direction of the arrows indicated in the drawings and the grass as cut passes over the apron upon the brush D which carries it into the hopper E. From the hopper the grass is conducted by a current of air produced by the exhaust from the engine into the receptacle F which as shown consists of a ring or hoop 115 which is supported upon the handle bar 5 by means of brackets 116. This ring has a number of inwardly projecting spikes 117 which are adapted to engage the open end of a sack 118 and hold it open to receive the grass from the conveyer pipe 42. When the sack 118 is filled with grass it can be quickly and easily detached from the hoop 118 and either emptied or a fresh one substituted. The mounting of the frame upon the main shaft 15 and the traction wheels 17 and 18 is such as to nearly balance it so that normally the machine will stand of its own weight upon all of the wheels or by the application of a slight pressure upon the handles 83 and 95, it can be tilted with its forward end up to either cause the cutting blades to pass over an obstruction or enable easy and quick manipulation of the parts.

In accordance with the patent statutes I have described the principle of operation of my invention together with apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:

1. The combination with a lawn mower, of an elevated receptacle, a suction tube associated with the cutting mechanism to lift the cut grass into said receptacle and a gasolene engine having its exhaust passageway connected with said suction tube to produce an upward draft therein; whereby as grass is cut by said mechanism during the forward movement of said machine waste is lifted from the cutting mechanism into said receptacle by the upward draft which is produced by the exhaust of the engine passing into said tube.

2. The combination with a lawn mower, of a grass receptacle, means for conveying cut grass from the cutting mechanism into said receptacle, a pair of handles for guiding said machine by human aid, said handles being mounted to move, a motor for driving said cutting mechanism, and means mounted upon said handles for controlling the operation of said motor through said handles.

3. A machine of the class set forth, comprising in combination, a frame, cutting mechanism carried by said frame, traction wheels for carrying said frame, actuating mechanism for revolving said cutting mechanism and said traction wheels, a suction tube extending upward and associated with and adapted to convey cut grass away from said cutting mechanism and a gasolene engine having its exhaust passageway connected with said tube for producing an upward current of air therein; whereby as grass is cut by said cutting mechanism during the forward movement of said machine waste is carried upward from the cutting mechanism by the current of air passing through said tube.

4. The combination with a lawn mower, of an elevated grass receptacle, means for detachably supporting said receptacle thereon, a suction tube leading upwardly from the cutting mechanism into said receptacle and a gasolene engine having its exhaust passageway connected with said tube for producing an upward draft therein; whereby as the mower advances and cuts the grass the suction tube lifts the waste from the cutting mechanism into said receptacle.

5. The combination with a lawn mower, of an elevated grass receptacle, a suction tube leading upwardly from the cutting mechanism into said receptacle and a gasolene engine having its exhaust passageway connected with said tube for producing an up draft therein; whereby as the mower advances and cuts the grass the suction tube lifts the waste from the cutting mechanism into said receptacle.

6. The combination with a lawn mower, of a grass receptacle, means for conveying cut grass from the cutting mechanism into said receptacle, a handle for guiding said mower by human aid, said handle being mounted to move, a motor for driving said cutting mechanism and means mounted upon said handle for controlling the operation of said motor through said handle by hand while the mower is being guided.

7. The combination with a lawn mower, of grass cutting mechanism, a motor for actuating said mechanism, a handle for guiding said mower by human aid, said handle being mounted to move and means mounted upon said handle for controlling the operation of said motor by hand through said handle while the mower is being guided.

8. The combination of a mower with a traction wheel, a motor for propelling said wheel, a handle for guiding said mower by human aid, said handle being mounted to move, and means carried by said handle to bring said motor into and out of connection with said wheel by hand through said handle while the mower is being guided.

9. The combination with a mower, of a traction wheel, grass cutting mechanism, a motor for actuating said traction wheel and grass cutting mechanism, a pair of handles for guiding said mower by human aid, said handles being mounted to move, means carried by one of said handles for thereby manually connecting and disconnecting said motor from said traction wheel and means carried by the second handle for thereby manually causing said cutting mechanism to operate at a greater or less speed while the mower is being guided.

In testimony whereof, I have signed my name to this specification, in the presence of two subscribing witnesses.

VENNING P. HOLLIS.

Witnesses:
H. L. FISCHER,
F. G. BRADBURY.